US008869546B2

(12) United States Patent
Besore et al.

(10) Patent No.: US 8,869,546 B2
(45) Date of Patent: Oct. 28, 2014

(54) REFRIGERATION DEMAND RESPONSE RECOVERY (75) Inventors: John K. Besore, Prospect, KY (US); Timothy Dale Worthington, Crestwood, KY (US); Michael F. Finch, Louisville, KY (US); Darin Franks, Lanesville, IN (US); William Newton, Brooks, KY (US); Jeff Donald Drake, Louisville, KY (US)

(73) Assignee: General Electric Company, Schenectady, NY (US)

( * ) Notice: Subject to any disclaimer, the term of this patent is extended or adjusted under 35 U.S.C. 154(b) by 220 days.

(21) Appl. No.: 12/938,748

(22) Filed: Nov. 3, 2010

(65) Prior Publication Data

US 2012/0023987 A1   Feb. 2, 2012

(51) Int. Cl.
*H02J 3/14* (2006.01)
*F25D 29/00* (2006.01)
*G05D 23/32* (2006.01)
*F25D 21/04* (2006.01)

(52) U.S. Cl.
CPC ............... *F25D 29/00* (2013.01); *F25D 21/04* (2013.01); *H02J 2003/143* (2013.01); *H02J 2003/146* (2013.01); *G05D 23/32* (2013.01); *H02J 3/14* (2013.01)
USPC .................. 62/157; 62/158; 62/190; 62/231; 62/230; 236/51; 236/46 R; 340/870.17

(58) Field of Classification Search
USPC ........... 62/157, 158, 190, 215, 233, 231, 230; 340/870.16, 870.17; 705/7.22; 236/1 C, 236/51, 46 R, 46 C
See application file for complete search history.

(56) References Cited

U.S. PATENT DOCUMENTS

| 4,247,786 | A | 1/1981 | Hedges |
| 6,817,195 | B2 | 11/2004 | Rafalovich et al. |
| 7,010,363 | B2 | 3/2006 | Donnelly et al. |
| 7,110,832 | B2 | 9/2006 | Ghent |
| 7,266,962 | B2 | 9/2007 | Montuoro et al. |
| 2003/0233201 | A1 | 12/2003 | Horst et al. |
| 2004/0172956 | A1* | 9/2004 | Athanasiou et al. ............ 62/158 |
| 2005/0177282 | A1* | 8/2005 | Mason, II ..................... 700/300 |
| 2007/0220907 | A1 | 9/2007 | Ehlers |
| 2008/0106147 | A1 | 5/2008 | Caggiano et al. |
| 2010/0101254 | A1 | 4/2010 | Besore |
| 2011/0175742 | A1* | 7/2011 | Shin et al. ..................... 340/635 |
| 2012/0118989 | A1* | 5/2012 | Buescher et al. ............. 237/8 A |

OTHER PUBLICATIONS

Kimball Using Water Heaters to Store Excess Wind Energy publication date: Aug. 13, 2010 Retrieved from the Internet Sep. 20, 2013 URL:<http://8020vision.com/2010/08/13/using-water-heaters-to-store-excess-wind-energy/>.*

* cited by examiner

*Primary Examiner* — Ljiljana Ciric
*Assistant Examiner* — Alexis Cox
(74) *Attorney, Agent, or Firm* — Global Patent Operation; Marc A. Vivenzio (57) ABSTRACT A controller which receives a signal from an external associated energy utility indicative of a forthcoming rate increase period, and controls the rate of temperature change of a refrigerator from a user selected setpoint to a first targeted setpoint below the user selected setpoint. During the rate increase the controller establishes a second target setpoint above the user selected setpoint. After the rate increase period the controller reduces the temperature to the user selected setpoint at a constant rate defined by a number of degrees per minute.

11 Claims, 5 Drawing Sheets

REFRIGERATION DEMAND RESPONSE RECOVERY

REFERENCE TO RELATED APPLICATION

The present application incorporates by reference in its entirety U.S. patent application Ser. No. 12/559,561 filed 15 Sep. 2009.

BACKGROUND

This disclosure relates to energy management, and more particularly to energy management of household consumer appliances.

Currently utilities charge a flat rate, but with increasing cost of fuel prices and high energy usage at certain parts of the day, utilities have to buy more energy to supply customers during peak demand. Consequently, utilities are charging higher rates during peak demand. If peak demand can be lowered, then a potential huge cost savings can be achieved and the peak load that the utility has to accommodate is lessened.

One proposed third party solution is to provide a system where a controller "switches" the actual energy supply to the appliance or control unit on and off. However, there is no active control beyond the mere on/off switching. It is believed that others in the industry cease some operations in, for example, a refrigerator during on-peak time.

For example, in a refrigerator most energy is consumed to keep average freezer compartment temperature at a constant level. Recommended temperature level is based on bacteria multiplication. Normally recommended freezer temperature for long (1-2 month) food storage is 0 degrees F. Research shows that bacteria rise is a linear function of the compartment temperature, i.e., the lower the temperature the lower the bacteria multiplication. Refrigerator designers now use this knowledge to pre-chill a freezer compartment (and in less degree a refrigerator compartment also) before defrost, thus keeping an average temperature during time interval that includes before, during, and after defrost at approximately the same level (for example, 0 degrees F.).

There are also currently different methods used to determine when variable electricity-pricing schemes go into effect. There are phone lines, schedules, and wireless signals sent by the electrical company. One difficulty is that no peak shaving method for an appliance such as a refrigerator will provide a maximal benefit. Further, different electrical companies use different methods of communicating periods of high electrical demand to their consumers. Other electrical companies simply have rate schedules for different times of day.

Electrical utilities moving to an Advanced Metering Infrastructure (AMI) system will need to communicate to appliances, HVAC, water heaters, etc. in a home or office building. All electrical utility companies (more than 3,000 in the U.S.) will not be using the same communication method to signal in the AMI system. Similarly, known systems do not communicate directly with the appliance using a variety of communication methods and protocols, nor is a modular and standard method created for communication devices to interface and to communicate operational modes to the main controller of the appliance. Although conventional WiFi/ZigBee/PLC communication solutions are becoming commonplace, this disclosure introduces numerous additional lower cost, reliable solutions to trigger "load shedding" responses in appliances or other users of power. This system may also utilize the commonplace solutions as parts of the communication protocols.

BRIEF DESCRIPTION OF THE DISCLOSURE

According to one aspect, a refrigerator is provided comprising: a fresh food compartment; a freezer compartment; one or more power consuming features/functions including a refrigeration system for cooling the fresh food compartment and freezer compartment; and, a controller operatively connected to the one or more power consuming features/functions. The controller can be configured to receive and process a signal indicative of current state of an associated energy supplying utility. The controller operates the refrigerator in one of plurality of operating modes, including at least a normal operating mode and an energy savings mode. In response to the received signal, the controller can be configured to cool at least one of the fresh food and freezer compartments to a first targeted setpoint temperature below the user selected setpoint temperature prior to the rate increase time period. The controller can be configured to establish a second targeted setpoint temperature of at least one of the fresh food and freezer compartments above the user selected setpoint temperature during the rate increase time period. The controller can reduce the second targeted setpoint temperature of at least one of the fresh food and freezer compartments back to the user selected setpoint temperature after the rate increase time period. The controller can adjust at a first controlled rate the temperature change from the user selected setpoint temperature to the first targeted setpoint temperature, and can adjust at a second controlled rate the temperature change from the second targeted setpoint temperature back to the user selected setpoint temperature to reduce power consumption of the refrigerator in the normal operating mode and the energy savings mode.

The present disclosure reduces power consumption during on-peak demand/cost hours by reducing the energy demand on the power generation facility, and also enabling the user/consumer to pay less to operate the appliance on an annual basis.

According to another aspect, a refrigerator is provided comprising: a fresh food compartment having a user selected setpoint temperature; a freezer compartment having a user selected setpoint temperature; a refrigeration system, including temperature sensors for sensing the temperature in the fresh food and freezer compartments and a compressor, for cooling each of the fresh food compartment and the freezer compartment to an operational setpoint temperatures which under steady state conditions in the normal operating mode are the user selected setpoint temperatures; and, a controller configured to receive and process an energy signal. The signal can have a first state indicative of a utility peak demand period and a second state indicative of a utility off-peak demand period. The controller operates the refrigerator in one of an energy savings mode and a normal operating mode based on the received signal being in the first and second states respectively. The controller is configured to reduce at a first controlled rate, before peak demand period, the operational setpoint temperature from the user selected setpoint temperature of at least one of the fresh food compartment and the freezer compartment to a first targeted setpoint temperature lower than the user selected setpoint temperature to pre-chill the at least one of the fresh food compartment and the freezer compartment. The controller is configured to increase the operational setpoint temperature to a second targeted setpoint temperature higher than the user selected setpoint temperature of at least one of the fresh food compartment and the freezer compartment in the energy savings mode during peak demand period. In addition, the controller adjusts at a second controlled rate the operational setpoint temperature from the second targeted setpoint temperature back to the user selected setpoint temperature of at least one of the fresh food compartment and the freezer compartment to reduce power consumption of the refrigerator in the normal operating mode and the energy savings mode.

Still other features and benefits of the present disclosure will become apparent from reading and understanding the following detailed description.

DETAILED DESCRIPTION

A refrigerator can be configured to receive a signal indicating that it needs to shed load. Typically this is done through a pricing scheme that raises the price, or a Demand Response program that pays the consumer for shedding load on request. Typically these requirements are known in advance and sent out as a schedule allowing for advance notice to prepare for the event. The operation of a refrigerator may be modified or altered by reducing the temperature, in the fresh food and freezer compartments pre on-peak time and further temporarily provide a compartment temperature increase to shave on-peak load. Other power load reducing measures in a refrigerator may include reducing (before on-peak hours) the temperature of the freezer and fresh food compartments in a refrigerator (i.e. pre-chill) and slightly increase temperature setting during on-peak rates. For example, just before peak rate time, the temperature setting could be decreased by 1-7 degrees (during off-peak rates).

Figure 1:
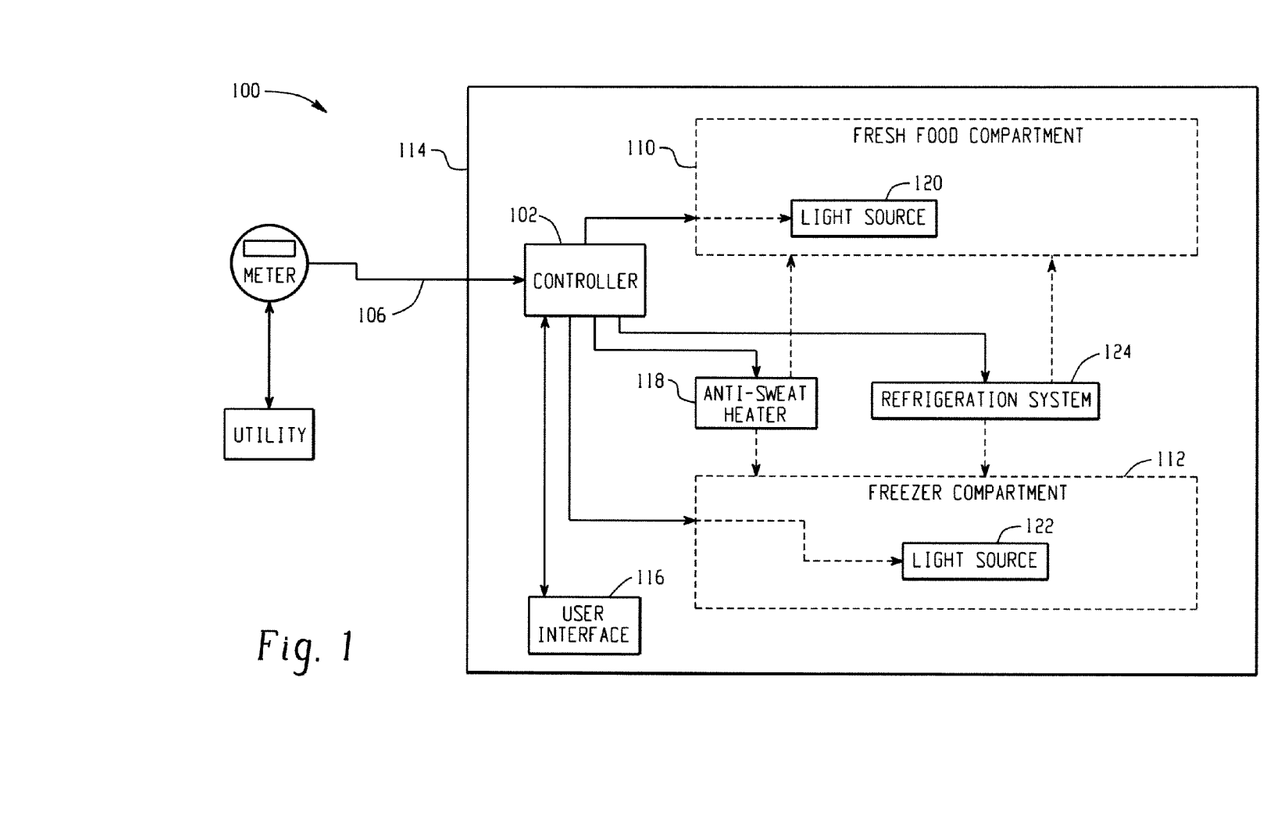
FIG. 1 is a schematic illustration of an exemplary demand managed refrigerator.

An exemplary embodiment of a demand managed refrigerator 100 is schematically illustrated in FIG. 1. The refrigerator 100 comprises one or more power consuming features/functions and a controller 102 operatively connected to each of the power consuming features/functions. The controller 102 can include a micro computer on a printed circuit board which is programmed to selectively control the energization of the power consuming features/functions. The controller 102 is configured to receive and process a signal 106 indicative of a utility state, for example, availability and/or current cost of supplied energy. The energy signal may be generated by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period. Some utilities may have three, four, or five states or periods. The utility can send a schedule of events to the refrigerator, including the energy state and a time at which that state becomes active. This can be done simply by sending the next state and next state start time, or a schedule for an entire day. Some systems may send the state, start time, and duration of the state. To facilitate operating devices without exact clocks, some systems may also include the current time, so that a device can count the seconds until the next event starts The refrigerator can be in the form of a "side-by-side" refrigerator which has a fresh food compartment 110 located to the side of a freezer compartment 112. Alternatively, the refrigerator can be in the form of "bottom freezer" or "bottom mount freezer" refrigerator which has the fresh food compartment 110 located above the freezer compartment 112. The present invention is therefore not intended to be limited to any particular type or configuration of a refrigerator.

The fresh food compartment 110 and freezer compartment 112 are contained within an outer case or cabinet 114. Each of these compartments has its own door mounted on hinges secured to the cabinet, and has a magnetic sealing gasket around its periphery that engages with a smooth magnetic surface around each of the associated food compartments opened and closed by the door. A control panel or user interface 116 is provided on one of the doors and is operatively connected to the controller 102. The control panel 116 can include a display and control buttons for making various operational selections. At least one electrically driven anti-sweat heater 118 is provided for preventing exterior condensation. Light sources 120, 122 illuminate the respective fresh food and freezer compartments 110, 112. Generally, the refrigerator 100 includes a refrigeration system 124 including temperature sensors for sensing the temperatures in at least one of the fresh food and freezer compartments and a compressor, which system is operative to cool the fresh food compartment 110 and the freezer compartment 112 to respective operational setpoint temperatures which under normal steady state operating conditions are user selectable setpoint temperatures. Normally, the fresh food compartment has a selectable range centered around a setpoint temperature of about 37° F. and the freezer compartment has a selectable range centered around a setpoint temperature of about 0° F.

Figure 2:
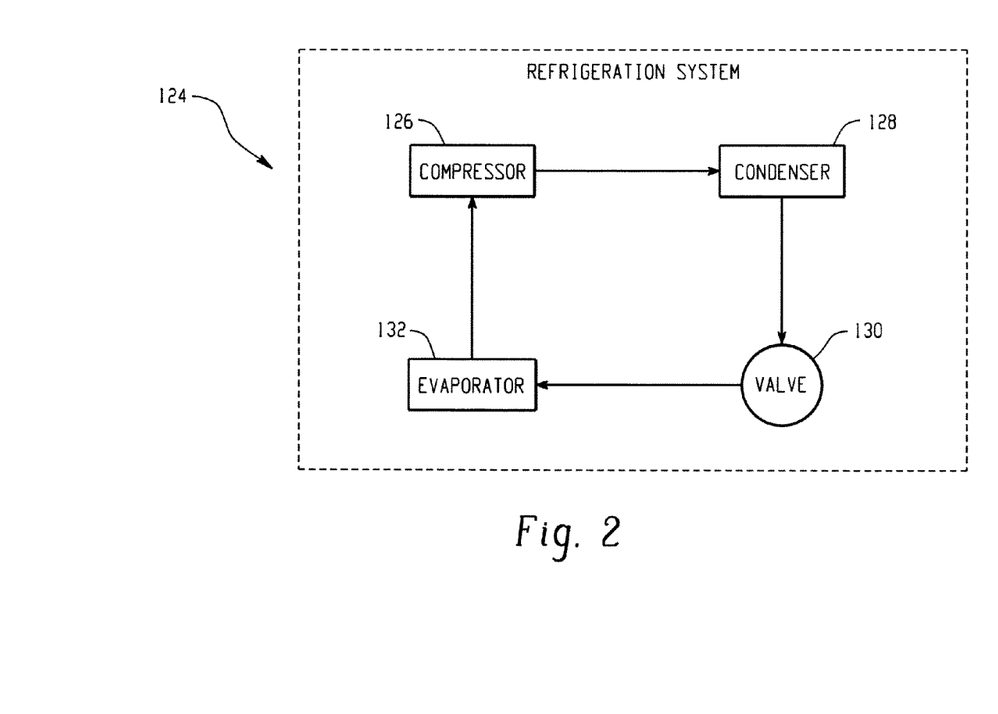
FIG. 2 is a schematic illustration of a refrigeration system for the refrigerator of FIG. 1.

In accordance with known refrigerators, the refrigeration system 124 at least partially contains components for executing a known vapor compression cycle for cooling air in the fresh food and freezer compartments 110, 112. In the illustrative embodiment of FIG. 2, the refrigeration system 124 includes a compressor 126, a condenser 128, an expansion device 130, and an evaporator 132 connected in series and charged with a refrigerant. The evaporator is a type of heat exchanger that transfers heat from air passing over the evaporator to a refrigerant flowing through the evaporator, thereby causing the refrigerant to vaporize. The cooled air is used to refrigerate one or more fresh food or freezer compartments, such as the fresh food and freezer compartments 110, 112, via fans (not shown). Collectively, the vapor compression cycle components in the refrigeration circuit, associated fans, and associated compartments are referred to herein as the refrigeration system 124. The construction of the refrigeration system 124 is well known and therefore not described in detail herein, and the sealed system is operable to force cold air through the refrigerator 100.

In order to reduce the peak energy consumed by the refrigerator 100, the controller 102 can be configured to at least one of selectively delay, adjust and disable at least one of the one or more above described power consuming features/functions to reduce power consumption of the refrigerator 100 in the energy savings mode. Reducing total energy consumed also encompasses reducing the energy consumed at peak times and/or reducing the overall electricity demand. Electricity demand can be defined as average watts over a short period of time, typically 5-15 minutes. Off peak demand periods correspond to periods during which lower cost energy is being supplied by the utility relative to peak demand periods. Operational adjustments that result in functional energy savings will be described in detail hereinafter.

As set forth above, both the fresh food compartment and the freezer compartment have a user selected setpoint temperature in the normal operating mode. To reduce the power consumption of the refrigerator 100 in the energy savings mode, the controller 102 is configured to increase the operational setpoint temperature of the freezer compartment 112 to precipitate less compressor on time in the energy savings mode. For example, the controller can increase the operational setpoint temperature of the freezer compartment from 0° F. to about 6° F. The controller 102 can also increase the operational setpoint temperature of the fresh food compartment 110 in the energy savings mode. For example, the controller can increase the operational setpoint temperature of the fresh food compartment from 37° F. to about 43° F.

Figure 3:
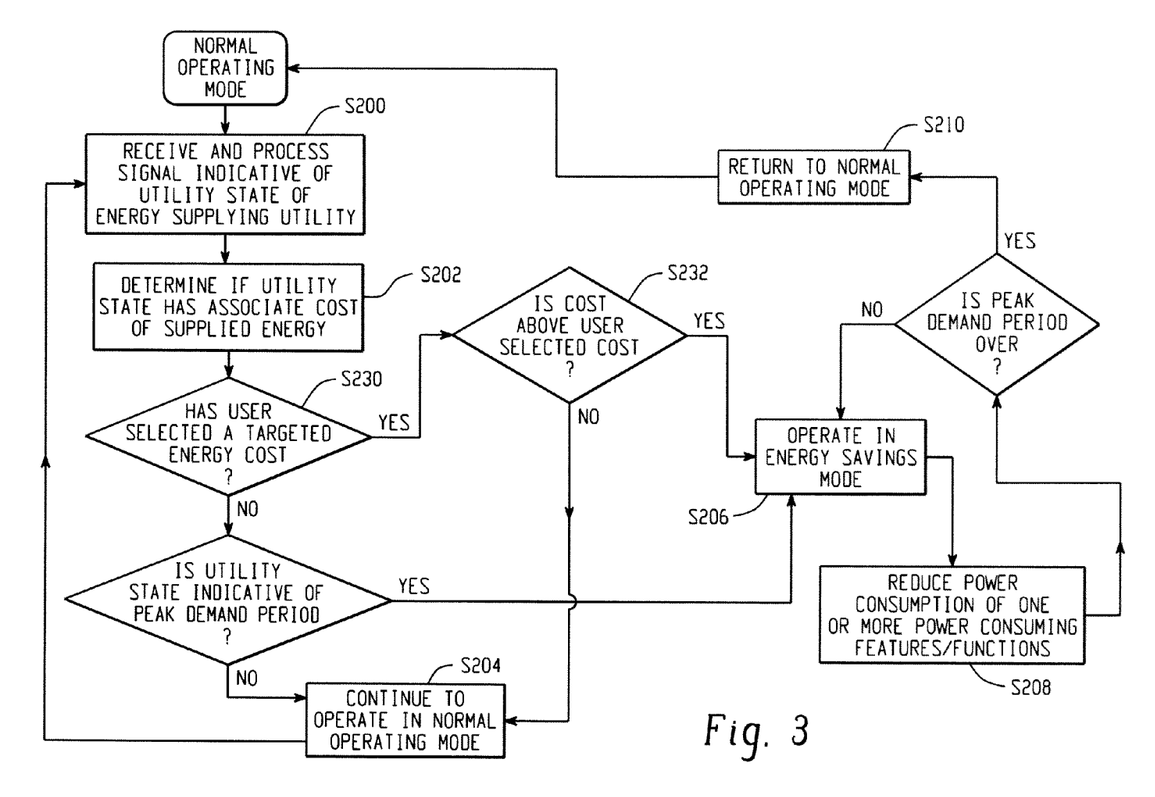
FIG. 3 is an exemplary operational flow chart for the refrigerator of FIG. 1.

With reference to FIG. 3, a refrigerator control method in accordance with the present disclosure comprises receiving and processing the signal indicative of cost of supplied energy (S200), determining a state for an associated energy supplying utility, such as a cost of supplying energy from the associated utility (S202), the utility state being indicative of at least a peak demand period or an off-peak demand period, operating the refrigerator 100 in a normal mode during the off-peak demand period (S204), operating the refrigerator in an energy savings during the peak demand period (S206), scheduling, delaying, adjusting and/or selectively deactivating any number of one or more power consuming features/functions of the refrigerator 100 to reduce power consumption of the refrigerator in the energy savings mode (S208), and returning to the normal mode after the peak demand period is over (S210).

Figure 5:
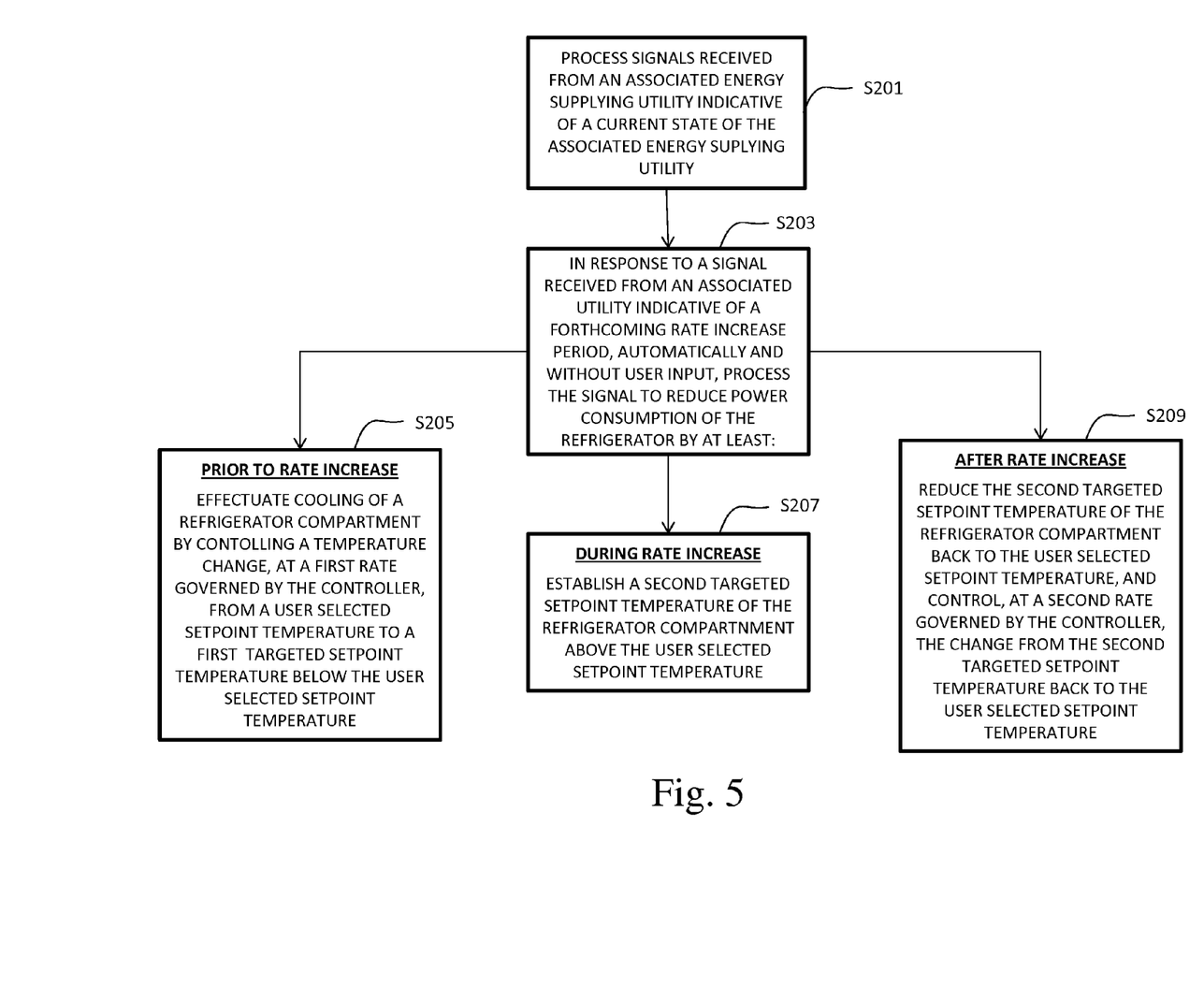
FIG. 5 is an exemplary operational flow chart for the refrigerator of FIG. 1.

With reference to FIG. 5, an embodiment of a refrigerator control method in accordance with the present disclosure is illustrated. The method comprises processing signals received from an associated energy supplying utility indicative of a current state of the associated energy supplying utility (S201); responding to a signal received from the associated energy supplying utility indicative of a forthcoming rate increase period, automatically and without user input, and processing the signal to reduce power consumption of the refrigerator (S203). Processing the signal to reduce power consumption of the refrigerator (S203) is accomplished by at least: (i) prior to a rate increase period, effectuating cooling of at least one of the fresh food compartment and the freezer compartment by controlling a temperature change, at a first rate governed by the controller, from a user selected setpoint temperature to a first targeted setpoint temperature below the user selected setpoint temperature (S205); (ii) during the rate increase period, establishing a second targeted setpoint temperature of at least one of the fresh food compartment and the freezer compartment above the user selected setpoint temperature (S207); and (iii) after the rate increase period, reducing the second targeted setpoint temperature of at least one of the fresh food compartment and the freezer compartment back to the user selected setpoint temperature, and controlling, at a second rate governed by the controller, the change from the second targeted setpoint temperature back to the user selected setpoint temperature (S209), the second rate being a constant rate defined by a set number of degrees per minute to smooth out and reduce energy demands occurring after the rate increase period.

It is to be appreciated that a manual or selectable override can be provided on the user interface 116 providing a user the ability to select which of the one or more power consuming features/functions are delayed, adjusted and/or disabled by the controller in the energy savings mode. The user can override any adjustments, whether time related or function related, to any of the power consuming functions. Further, the user can override the current operating mode of the refrigerator 100. Particularly, as shown in FIG. 3, if the utility state has an associated energy cost, the user can base operation of the refrigerator on a user selected targeted energy cost, such as a selected pricing tier or cost per kilowatt hour charged by the corresponding utility (S230). If the current cost exceeds the selected cost, the controller 102 will operate the refrigerator 100 in the energy savings mode (S232). If the current cost is less than the selected cost, the controller 102 will operate the refrigerator 100 in the normal mode. This operation based on a user selected cost is regardless of the current energy cost being indicative of one of a peak demand period and an off-peak demand period.

Figure 4:
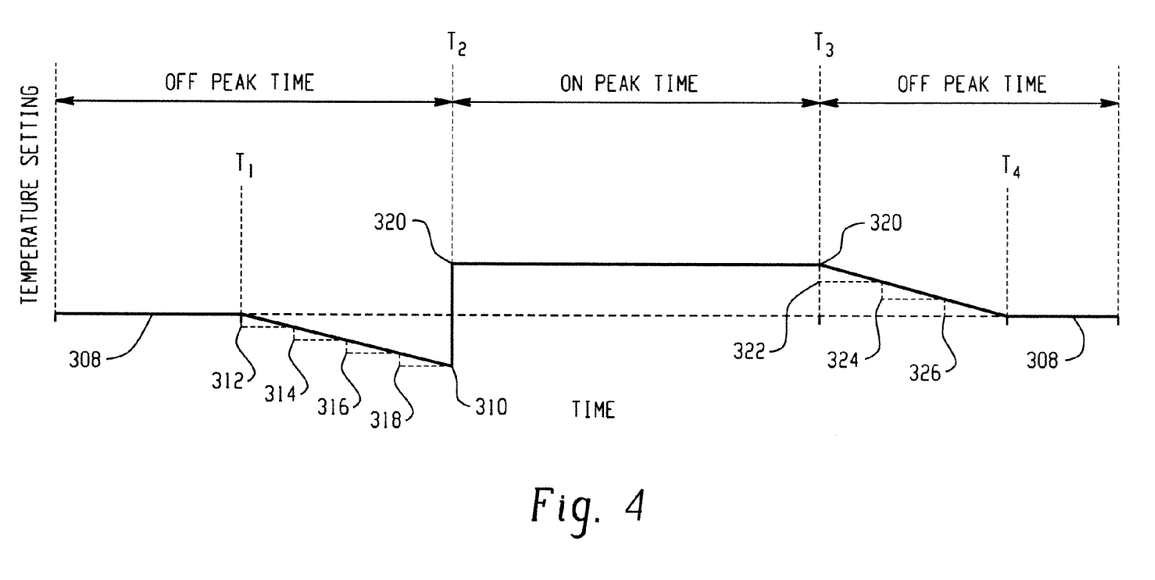
FIG. 4 is a schematic chart of the controlled temperature settings of the demand managed refrigerator during off-peak and on-peak time periods.

Referring now to FIG. 4, it is to be appreciated that the demand response refrigerator can both shift energy off peak and save energy on peak, while conserving energy during transition periods from off peak to on peak and vice versa. As mentioned hereinbefore, one aspect of operating in an energy saving mode is to increase the operational setpoint temperatures of one or both compartments to target setpoints higher than the user selected setpoints to reduce the cooling demands on the cooling system. This increase could simply be initiated in response to a signal indicative of a peak demand period. However, in order to reduce the adverse impact on the items being stored in the compartments during the ensuing period when a higher setpoint permits the temperature to rise in the compartments above that selected by the user, in accordance with one aspect of the present invention, prior to operation in the energy savings mode, one or both compartments is prechilled to a first targeted setpoint temperature 310 lower than the user selected setpoint temperature 308. Such a change in setpoint temperature requires the cooling system to run more than otherwise, but by operating the system more in the off peak period, the system will be required to run less in the higher cost peak demand period. In this manner, the energy demand is reduced during the on peak rate period, due to the fact that the refrigerator temperature is below the user selected setpoint temperature when operation in the energy saving mode begins and must warm to the increased second targeted setpoint temperature 320 which is above the user selected setpoint temperature 308 before the compressor is activated. To further conserve energy, the demand on the cooling system in the prechill mode is lessened by gradually reducing the operational setpoint from the user setpoint 308 to the first target setpoint 310 in controlled fashion rather than an abrupt change from user setpoint 308 to target setpoint 310. In cooling systems in which the response varies as a function of the sensed differential between the sensed temperature in the controlled compartment and the operational setpoint for that compartment, the peak energy consumed by the system will be less if the temperature differential is retained within a range in which the system response is less than the maximum system response. Similarly, on termination of a peak demand period when the system returns to operation in the normal operating mode, an abrupt change in the operational setpoint from the second target setpoint 320 higher than the user selected setpoint 308 would maximize the demand on the cooling system. To minimize this impact, in accordance with another aspect of the present invention, in transitioning the operational setpoint temperature from the second higher target setpoint 320 back to the user selected setpoint 308, the operational setpoint temperature is adjusted in controlled fashion so as to maintain the temperature differential between sensed temperature and operational setpoint temperature within a range that calls for less than the maximum response from the cooling system. In both the prechill phase prior to operation in the energy saving mode, and this recovery phase at the beginning of the next normal operating mode, the change of operational setpoint temperatures may be reduced at a constant rate, or intermittently in a series of steps.

Referring again to FIG. 4, a graph 300 illustrates an example of varying the operational setpoint temperature as a function of time at a constant rate which enables the refrigerator to pre-chill to a first target setpoint temperature 310 below the user selected setpoint temperature 308. The time duration from T1 to T2 can be from about 40 minutes to about 60 minutes, over which the operational setpoint temperature is changed from 308 to 310 which enables controlled compressor usage and minimizes the energy demands of the refrigerator. In this manner, the pre-chill temperature change (delta [308-310]) can be from about 1 degree to about 7 degrees which provides an advantage of 'pre-chilling' the refrigerator for the on peak energy period by lowering the temperature within the fresh food and/or freezer compartments during off peak rate period thereby reducing the energy demands during the subsequent on peak rate period. In one exemplary arrangement, the first target setpoint temperature for the prechill phase is set at five degrees less than the user setpoint temperature. So for a user selected setpoint temperature in the freezer of 0 degrees, the first target setpoint temperature is minus 5 degrees. The time from T1 to T2 can be determined by the refrigerator manufacturer and can be dependent upon compressor capacity, cubic feet of refrigerated space, ambient temperature, et al. The delta $(T_2-T_1)$ can be a fixed number that would be reasonable for a typical offset and a typical ambient temperature (i.e. $T_2-T_1=50$ minutes), or it can be dynamically calculated by the controller based on the difference between temp 308 and temperature 310. The delta $T_2-T_1$ can be chosen and predetermined by the refrigerator manufacturer and can either be a fixed time period or it can be a calculation based on a combination of variables, for example, current temperature, pre-chill temperature, and room ambient temperature. It is to be appreciated that the greater the temperature or delta separation the longer the pre-chill time at a consistent compressor output. Additionally, the algorithm can adjust for the ambient temperature, such that the warmer the room, the longer the associated pre-chill time. If the setpoint temperature differential between user setpoint 308 and first target setpoint 310 comprises 5 degrees and the time duration for the prechill is 50 minutes, then the rate of change of the operational setpoint temperature is 1 degree every 10 minutes. As long as the rate of temperature change in the freezer compartment can be achieved at a comparable rate with a compressor running at less than peak output, then the controlled rate of temperature change is beneficial from an energy savings standpoint. The controller can initiate an algorithm and initiate the temperature change at $T_1$ when appropriate.

In another arrangement, the change in setpoint temperature can be enabled in gradient steps. For example, step 1 can include a first sub-target operational setpoint 312 that is between the user selected setpoint temperature 308 and the final target setpoint temperature 310. Once the first sub-target operational setpoint temperature 312 is reached, a second sub-target operational setpoint temperature 314 can be established between the first sub-target operational setpoint temperature 312 and the final target setpoint temperature 310 wherein the refrigerator runs the compressor with the lowest energy demand until the second sub-target operational setpoint temperature 314 is reached. This pattern of sub-target temperature change, i.e. sub-target setpoints 316, 318, continues until the final target setpoint temperature 310 is reached. It is to be appreciated that the final sub-target operational setpoint 318 can be equal to the final target setpoint temperature 310. The intermediate temperatures can be selected so that the difference between the initial temperature and the first set point is small enough that the compressor will run at normal (low) speed. This pattern reduces the opportunity for the compressor to go to a high speed mode, reducing energy consumption in the off-peak period, but reducing the savings opportunity in the on-peak period. If because of recent food loading, or ambient temperature the refrigerator cannot be brought to the first intermediate setpoint at low speed, the compressor would not go to high speed to cool faster.

Similar to the above description, an extended time period T3 to T4 (i.e. less than the minimum time period necessary at maximum compressor output), for adjusting the setpoint temperature from 320 back to the user selected set point temperature smoothes out and reduces the energy demands during the off peak rate period subsequent to the on peak rate period. Similar to the discussion above, it is to be appreciated that the extended period from T3 to T4 can utilize a more efficient operating mode of the refrigerator wherein demands to chill the refrigerator do not require the compressor to operate at maximum output to reduce the temperature of the refrigerator. In one arrangement, the change in setpoint temperature from 320 to 308 can be enabled and dependent upon more efficient settings and efficient mode of operation to facilitate the temperature change with the least amount of energy demand. In another arrangement, the operational setpoint temperature change from 320 to 308 can be accomplished at a constant rate. For example, the change in temperature can be enabled to change a set number of degrees (x) for every minute elapsed (y) from T3 to T4 until the setpoint 308 is reached. This arrangement ensures that the setpoint temperature can be reached in a fixed amount of time. In yet another arrangement, the change in operational setpoint temperature can be enabled in gradient steps. For example, step 1 can include a first sub-target operational setpoint 322 that is between the second target setpoint temperature 320 and the final target user selected setpoint temperature 308. Once the first sub-target operational setpoint temperature 322 is reached, a second sub-target operational setpoint temperature 324 can be established between the first operational sub-setpoint temperature 322 and the final target setpoint temperature 308 and the refrigerator runs the compressor with the lowest energy demand until the second sub-point temperature is reached. This pattern of temperature changes continue, i.e. sub-target setpoint temperature 326, until the final setpoint temperature 308 is reached.

The aforementioned process allows the refrigerator to pre-chill and recover under a controlled method after a demand response event. The method minimizes the off-peak and on-peak energy consumption of the appliance and provides additional benefit to customer and utility. This is especially important in areas with midday peaks and shoulder areas where recovery does not take place at lowest rate. The process can be achieved either within the control of the refrigerator, or by an external controller in communication with the refrigerator.

The process described above discloses a method of adjusting the temperature of the refrigerator and/or freezer gradually over time. The process can work for refrigerators that have variable speed fans, compressors or other controls on the cooling system versus merely on/off.

It will be appreciated that various of the above-disclosed and other features and functions, or alternatives thereof, may be desirably combined into many other different systems or applications. Also, that various alternatives, modifications, variations or improvements therein may be subsequently made by those skilled in the art which are also intended to be encompassed by the following claims.

What is claimed is:

1. A refrigerator comprising:
a fresh food compartment;
a freezer compartment;
one or more power consuming features configured to respectively cool the fresh food compartment and the freezer compartment to an operational setpoint temperature; and
a controller operatively connected to the one or more power consuming features of the refrigerator and configured to at least:
process signals received from an external associated energy supplying utility indicative of a current state of the external associated energy supplying utility; and
in response to a signal received from the associated utility indicative of a forthcoming rate increase period, automatically and without user input, process the signal to reduce power consumption of the refrigerator by at least:
prior to a rate increase period, effectuate cooling of at least one of the fresh food compartment and the freezer compartment by controlling a temperature change, at a first rate governed by the controller, from a user selected setpoint temperature to a first targeted setpoint temperature below the user selected setpoint temperature;
during the rate increase period, establish a second targeted setpoint temperature of at least one of the fresh food compartment and the freezer compartment above the user selected setpoint temperature; and
after the rate increase period, reduce the second targeted setpoint temperature of at least one of the fresh food compartment and the freezer compartment back to the user selected setpoint temperature, and control, at a second rate governed by the controller, the change from the second targeted setpoint temperature back to the user selected setpoint temperature, the second rate being a constant rate defined by a set number of degrees per minute to smooth out and reduce energy demands occurring after the rate increase period.

2. The refrigerator of claim 1, wherein the first rate includes a time period from about 40 minutes to about 60 minutes and comprises a rate of temperature setpoint change having a fixed number of degrees per minute from the user selected setpoint temperature to the first targeted setpoint temperature.

3. The refrigerator of claim 2, wherein the second rate includes a time period from about 40 minutes to about 60 minutes.

4. The refrigerator of claim 1, wherein the first rate includes a first temperature setpoint change having a number of gradient steps between the user selected setpoint temperature and the first targeted setpoint temperature.

5. The refrigerator of claim 1, wherein the one or more power consuming features includes an activation mode wherein the activation of the feature occurs over a period of time to include a minimization of the energy consumed after the rate increase time period.

6. A refrigerator comprising:
a fresh food compartment;
a freezer compartment;
a refrigeration system comprising a compressor and configured to respectively cool the fresh food compartment and the freezer compartment to an operational setpoint temperature; and
a controller operatively connected to the refrigeration system and configured to at least:
process signals received from an external associated energy supplying utility indicative of a current state of the external associated energy supplying utility; and
in response to a signal received from the associated utility indicative of a forthcoming rate increase period, automatically and without user input, process the signal and control the refrigeration system to effectuate a reduction in power consumption of the refrigerator by at least:
prior to a rate increase period, effectuate cooling of at least one of the fresh food compartment and the freezer compartment by controlling a temperature change, at a first rate governed by the controller, from a user selected setpoint temperature to a first targeted setpoint temperature below the user selected setpoint temperature;
during the rate increase period, establish a second targeted setpoint temperature of at least one of the fresh food compartment and the freezer compartment above the user selected setpoint temperature; and
after the rate increase period, reduce the second targeted setpoint temperature of at least one of the fresh food compartment and the freezer compartment back to the user selected setpoint temperature, and control, at a second rate governed by the controller, the change from the second targeted setpoint temperature back to the user selected setpoint temperature, the second rate being a constant rate defined by a set number of degrees per minute to smooth out and reduce energy demands occurring after the rate increase period.

7. The refrigerator of claim 6, wherein the first rate includes a time period from about 40 minutes to about 60 minutes and comprises a first temperature change having a fixed number of degrees every minute from the user selected setpoint temperature to the first targeted setpoint temperature.

8. The refrigerator of claim 7, wherein the second rate includes a time period from about 40 minutes to about 60 minutes.

9. The refrigerator of claim 6, wherein the first rate includes a first temperature change having a stepped number of degrees adjusted as a variable as the temperature changes from the user selected setpoint temperature to the first targeted setpoint temperature.

10. The refrigerator of claim 9, wherein the variable comprises a series of steps based on a range in temperature between the user selected setpoint temperature and the first targeted setpoint temperature.

11. The refrigerator of claim 6, wherein the controller governs the first rate so that, during the temperature change from the user selected setpoint temperature to the first targeted setpoint temperature, the compressor operates at an output less than its maximum compressor output.

* * * * *